United States Patent [19]

McPeak

[11] Patent Number: 4,741,264
[45] Date of Patent: May 3, 1988

[54] RICE BRAN PROCESSING APPARATUS

[75] Inventor: Daniel L. McPeak, Torrance, Calif.

[73] Assignee: Brady International Inc., Torrance, Calif.

[21] Appl. No.: 859,452

[22] Filed: May 5, 1986

[51] Int. Cl.$^4$ .......................... A23K 1/14; A23K 3/00; A23L 1/20

[52] U.S. Cl. ........................................ 99/483; 99/348; 99/349; 366/81; 366/318; 366/319; 366/601

[58] Field of Search ................. 99/483, 516, 534, 536, 99/349, 329 P, 355, 443 C; 366/79, 81, 90, 318, 319, 324, 142, 601, 192, 319; 426/516, 523; 425/207-209; 403/335, 336; 100/117, 145

[56] References Cited

U.S. PATENT DOCUMENTS

| | | | |
|---|---|---|---|
| 2,767,963 | 10/1956 | Ringen et al. | 366/318 X |
| 3,685,429 | 8/1972 | McBride. | |
| 3,685,430 | 8/1972 | McBride. | |
| 3,687,423 | 8/1972 | Koch et al. | 366/81 |
| 3,695,891 | 10/1972 | Fox. | |
| 3,765,319 | 10/1973 | Fox. | |
| 3,924,839 | 12/1975 | Millauer | 366/81 |
| 4,092,015 | 5/1978 | Koch | 425/209 X |
| 4,107,788 | 8/1978 | Anders | 366/90 X |
| 4,462,693 | 7/1984 | Buschbom et al. | 366/601 X |
| 4,465,475 | 8/1984 | Mardorf. | |

Primary Examiner—Timothy F. Simone
Attorney, Agent, or Firm—Andrus, Sceales, Starke & Sawall

[57] ABSTRACT

A rice bran extruder apparatus maintains a continuous flow of bran with appropriate heating to stabilize the bran to prevent information of free fat acid and rancid oil. A supply hopper includes a rotating paddle to stir the bulk bran for continuous gravity feed of the bran into a feed conveyor mounted immediately beneath the hopper. The feed conveyor is aligned with the bran extruder to supply bran to the inlet opening. The extruder includes a flighted rotor and terminates in a conical discharge nozzle. Extrusion of the bran results in heating of the bran to stabilize the lipase, destroy bacteria and produce a stable bran providing oil and an edible end product. The flighted rotor has closely spaced flighting and at least 12 agitator elements secured between the flights for at least the last four flights to establish a continuous movement of the powdery rice bran through the extruder and positively prevents blow back of the bran. The extruder is directly connected to a universal voltage and frequency motor which operates at 885 RPM and produces 75 horsepower with widely differing A.C. voltages and/or frequencies. A slipping clutch is provided in the direct drive connection to prevent damage if the extruder is overloaded.

22 Claims, 2 Drawing Sheets

Fig.1

RICE BRAN PROCESSING APPARATUS

BACKGROUND OF THE PRESENT INVENTION

This application relates to a rice processing apparatus engineered to stablize the formation of free fatty acids in rice bran, and thereby, permit the extraction of edible oil and the processing of the remaining defatted rice bran into edible food products.

Rice is the most widely comsumed cereal in the world. Although rice is abundantly grown throughout the world, the processing of the collected rice has created a vast resource which is going to waste. The most nutritious part of the rice is polished off the grain during the milling process. One of the most nutritious foods known to man however starts to become rancid in a matter of minutes after the milling process, rendering it inedible to humans, and after several days, indigestible to animals. As a result, a tremendous demand has been created for an apparatus and a technology to stablize the rice bran, thus allowing the necessry time to: (1) extract the oil, and (2) utilize the remaining defatted rice bran as a high protein, low fat cereal food for human consumption.

The processing method and apparatus should, of course, be such as to maintain the maximum nutrients in the final cereal product, while permitting effective and relatively rapid processing. Further, it is essential that the apparatus and method be adaptable for use in environments of lesser developed countries. Optimally, the unit should be a relatively compact, self-contained unit, engineered and constructed to allow for ease of movement to various remote processing locations. This will permit the processing of the rice bran without the necessity for having to immediately transport the rice bran to a central processing location for stablization and/or extraction. It is also imperative that the equipment be simple to operate and low in cost to permit the economic stbilization of the rice bran without the necessity of making large capital investments.

After the hull is removed from the rice, approximately 6 to 8% of the brown rice kernal is polished, yielding white rice and a by-product, rice bran. During the milling process, lipase, a highly active enzyme, is released. Within minutes, the lipase reacts with oil in the rice bran, resulting in a very rapid hydrolysis of the oil into free fatty acids (F.F.A.) making the bran unfit for human consumption. Within one day, it is no longer economically feasible to extract oil from the rice bran, and after three days, it is no longer possible to use the bran as a feed for animals due to the rancidity of the oil.

Various methods of inhibiting the growth and stabilizing the F.F.A. level in the rice bran is found in the literature, including the heating of the bran product and reference therefore may be made to an article by Williams in the Journal of Oil Chem., Soc. 42, 151 (1965).

Although various bran processing systems have been suggested, the prior art has to the knowledge of the inventor completely failed to include any teaching of an apparatus and/or method for proper processing of rice bran to establish a suitable rice bran product which retains essentially all of the nutrients in a practical, low-cost method and apparatus particularly for use in lesser developed countries.

For example, U.S. Pat. No. 4,465,477 which is entitled "Apparatus for Continuously Extruding and Drying/Cooling Cereal Bran", issued Aug. 14, 1984, discloses a large and bulky rice bran extruder for treating of bran to stabilize the bran product, and which would be primarily usable in association only with very large white rice processing plants.

Soybean processing equipment has also been developed for heating and processing of raw and untreated soybeans in such a manner as to cook the soybean for removal of a heat libile growth inhibiting material. For example, U.S. Pat. Nos. 3,685,429 and 3,685,430 to McBride and 3,695,891 and 3,765,319 to Fox all similarly disclose soybean processing equipment and methods specifically directed to the treating of raw and unprocessed soybeans by an expression process in which the raw soybean is extruded to heat the soybean. In particular, raw untreated soybeans are passed through the extruder and the soybeans are heated as a result of the extrusion process. As the extruded soybean is released, it emits the libile inhibiting material in the released moisture. The discharge end structure is an adjustable extrusion cone to control termperature and pressure as the soybeans are extruded. Such apparatus cannot be applied to rice bran processing because of different characteristics of rice bran and the generally different considerations encountered in the processing of the products.

SUMMARY OF THE PRESENT INVENTION

The present invention is particularly directed to an improved method and apparatus for heating the milled rice bran to a high nutrient rice bran product for human consumption. Generally in accordance with the teaching of the present invention, the extruding apparatus is specially constructed for use in various remote locations having widely differing electrical power sources. Generally in accordance with the teaching of the present invention, the extruder is formed generally such as taught in the McBride patents with a rotor having a spiral flight, with the flights formed of round cross-section and permanently affixed to a solid core. The extruder chamber terminates in a discharge cone which is conically shaped. A hopper for receiving the rice bran is mounted above the extruder and includes a rotating stirrer unit driven with a separate D. C. motor. The stirrer unit agitates the bulk bran and positively prevents bridging of the material within the hopper and thereby insures the continuous gravity feed of the bran feed into the conveyor.

A feed conveyor is mounted immediately beneath the hopper, with a feed opening at the inner end of the extruder for controlled feeding of the rice bran to the extruder.

The flighted core extruder is specially formed with a plurality of agitator elements secured between the flights for a substantial distance from the extruder cone. The agitator elements are specially selected and located to establish a continuous pressurized state within the extruder acting to move the powdery rice bran in a forward direction through the extruder and particularly the extruder discharge cone. The extended agitator elements in particular positively prevent steam blowback as a result of steam pressure created with the heating and compressing the bran from the cone back into the extruder. The inventor has discovered that the characteristics of powdery bran requires significant additional agitator elements located throughout an extended length of the extruder to insure a pressurized feeding over and above that affected by the simple extrusion forces. The compacted rice bran is extruded through the conically shaped discharge cone, where the pressure and heat characteristic is such as to effectively destroy the lipase action and all bacteria, thereby stabilizing the rice bran and preventing the build up of free fatty acid. The extruder action does not destroy the nutrients or anti-oxidants present in the rice bran. The final product is suitable for human consumption and is of a particle size to allow efficient extraction of the oil therefrom. The flighting and agitator elements must be specially constructed and arranged to process the powdery bran product because of the characteristic imparted to the bran. Thus, it has been found necessary to provide a relatively closely spaced flighting construction with the oppositely oriented agitator elements to properly process rice bran. Although such a structure cannot be employed with heavier moist material such as soybeans, it has been found essential to the proper processing of rice bran.

Further, the less developed countries require special drive considerations. Thus, service must be maintained at an essential minimum to permit effective long life operation in a system which may be far removed from service personnel and/or parts. The apparatus should also be compact and sufficiently low cost to economically process the available. The rice bran processor is therefor constructed with a direct drive system using a universal voltage and frequency motor coupled directly to the extruder rotor. In an optinum construction, the motor is constructed to operate at 885 RPM and produce 75 horsepower, with widely differing alternating current voltage and/or frequencies which are encountered throughout the world.

BRIEF DESCRIPTION OF THE DRAWINGS

The accompanying drawings illustrate the best mode presently contemplated by the inventor(s) for carrying out the invention.

In the drawings.

DESCRIPTION OF THE ILLUSTRATED EMBODIMENT

Figure 1:
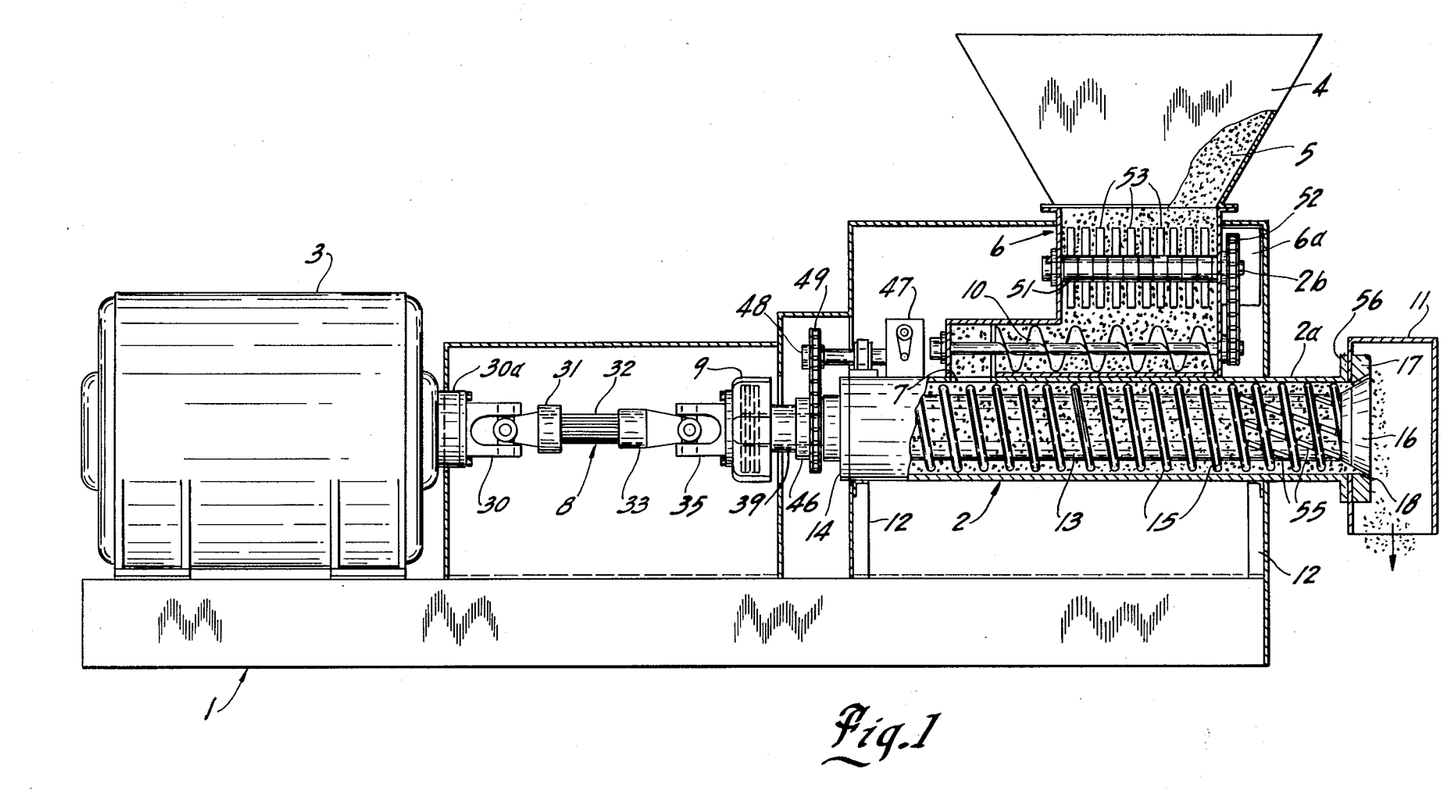
FIG. 1 is a side elevational view of a rice bran processing apparatus.
Figure 2:
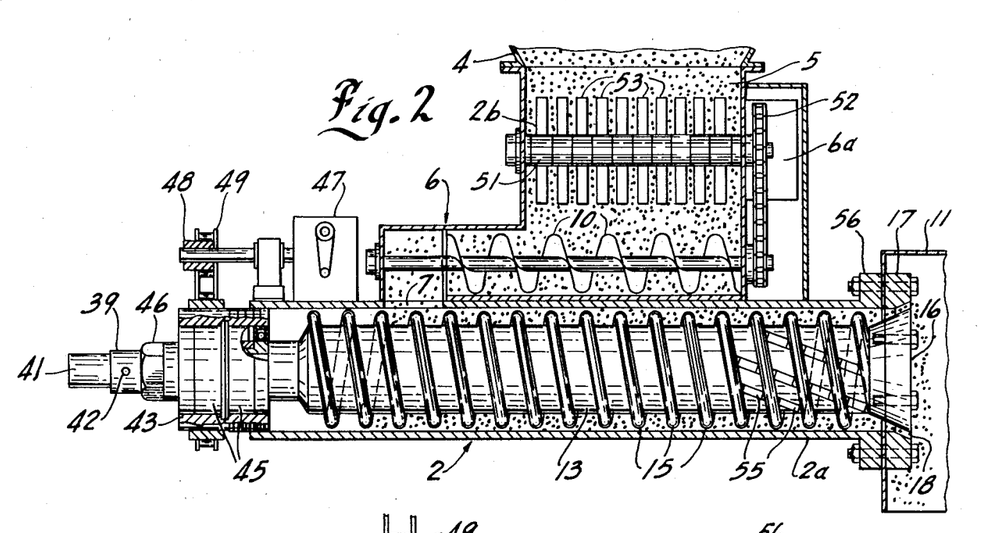
FIG. 2 is a side elevational view of a feed auger, rotor and stirrer only.
Figure 3:
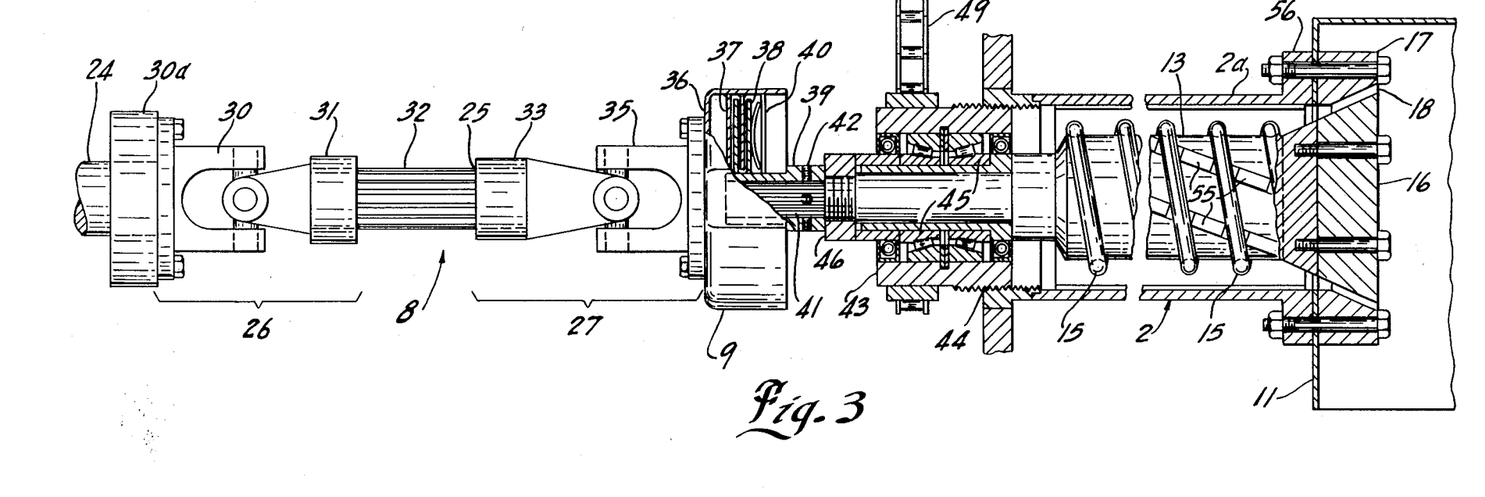
FIG. 3 is an enlarged vertical section of the drive train, rotor and cylinder.

Referring to the drawings and particularly to FIGS. 1-3, a rice bran extruder apparatus is illustrated which includes a supporting base structure 1 adapted to be movably mounted on a supporting floor or other structure. The extruder 2 is mounted to the support structure 1. A multi-voltage and multi-frequency A. C. (alternating current) motor 3 is secured to the structure 1 in alignment with and coupled to drive the extruder FIG. 1. A bran supply hopper 4 is mounted in overlying relation to the extruder and receives the rice bran 5 for controlled delivery to the extruder. A mechanical feed unit 6, is mounted in the bottom of the hopper and is operable for controlled transfer of the rice bran to an opening 7 between the mechanical feed unit 6 and the outside shell 2a of the extruder 2. A separate D. C. (direct current) motor 6a is coupled to drive a feed auger 10 of the feed unit 6 and a stirrer 2 in the hopper 4. The feed auger 10 has a large spiral blade to move the powdery bran 5 to the extruder 2. The feed auger may be operated at 175 RPM.

The rice bran is a relatively fine powdery material having the characteristic of flour and when fed into the hopper 4 and feeder 6 for gravity feed, a bridging effect may result within the bottom of the mechanical feed unit 6 such that the bran no longer gravity feeds into the feed auger 2a. The multiple bladed stirrer 2 is mounted in the hopper 4 and rotates continuously at a lower speed than the feed auger to provide continuous stirring of the rice bran 5 during the operation of the feed unit 6 and extruder 2 and thereby to insure continuous gravity feed of the powdery rice bran to the feed auger 2a and thereby to the extruder 2.

In the illustrated embodiment of the invention FIG. 1, a special direct drive coupling 8 connects the special motor 3 to directly drive the extruder 2. Coupling 8 is operable to carry and transmit all anticipated bran extruding loads and thereby maintain an essentially rigid, direct connection of motor to the extruder. The coupling 8 is further specially constructed with a releasable clutch unit 9 that provides automatic slippage at a set amount of torque and thereby disconnects the motor 3 from the extruder 2 in the event of a complete jamming thereby and preventing the motor 3 from being destroyed by overheating.

The combination of the direct drive 8 with the multiple voltage and frequency motor 3 particularly adapts the present construction for essentially universal application throughout the world. The structure is particularly adapted for use in less developed countries where electrical supply is not of the characteristic and quality found in many developed countries and the apparatus may be subject to operation by personnel with minimal skill and knowledge of the machine operation.

The illustrated extruder of FIG. 1 generally includes a basic construction such as heretofore used for processing of rice bran as well as other processing products such as soybeans for other purposes and results, with special modification for more effective processing of rice bran. The illustrated embodiment of the invention is typical of soybean apparatus which has been constructed based on the teachings of the previously identified McBride patents with the structure specially modified as in the construction of the extruder, the releasing drive connection, mechanical feed unit using a D. C. motor, stirrer, hopper and discharge box for processing rice bran. The present inventor has heretofore been involved in construction and analysis of equipment for processing soybeans and it was found tht such apparatus would not provide appropriate processing of rice bran for purposes of stablizing the rice bran.

More particularly as shown in FIG. 1, the extruder 2 includes a cylindrical outer casing or shell 2a horizontally mounted to the support structure 1. The shell 2a is aligned with and extends outwardly from the motor coupling 8 to a discharge chamber 11. The shell 2a is supported on spaced support members 12 to rigidly support the outer shell in coaxial alignment with the motor 3 and the coupling unit 8. The extruder rotor 13 is mounted, as a cantilevered member, within the outer tubular shell 2a and extends therethrough. The rotor 13 is rotatably supported adjacent the motor coupling 8 in an appropriate rotary bearing unit 14 which supports the rotor projecting outwardly concentrically through the shell. The rotor 13 includes a special spiral flight 15 extended throughout the length of the rotor. The rotor 13 is mounted with the flighting equally spaced between the upper wall and the lower wall of the outer shell 10, as subsequently described.

A processor cone section 16 is attached to the end of rotor 13 in an inwardly facing inclined or conical section located within a correspondingly shaped cup housing 17. The conical sections 16 and 17 define an annular extrusion gap 18.

Generally, the powdery bran 5 is fed by the feed auger 10 into the extruder through opening 7. The spiral flight 15 carries the rice bran 5 forwardly toward the discharge extruder opening 18. The bran 5 cannot move through the restricted opening at the feed rate created by the rotation of the flighted rotor 15 and as a result there is a compression and extrusion of the powdery bran 5. As is well known, this results in heating of the bran. The effective heating of the bran, however, requires that the powdery rice bran be progressively and continuously moved forwardly with a high degree of compression and high force extrusion through the opening 18 in order to properly heat the bran. In the United States for example, the United States Department of Agriculture will require treating of the bran at a temperature of at least 130 degrees Centigrade for stabilization of the bran and the prevention of free fatty acid build up within the bran. In particular, the heat treatment must be such as to effectively nullify the effects of the lipase and destroy all harmful bacteria in the bran. As previously noted, this requires that the rice bran be treated very shortly after milling the rice and at the appropriate temperature.

The present invention is particularly directed to the special construction of the extruding apparatus including the drive system to establish appropriate feeding of the powdery rice bran to an effective and reliable extruding apparatus.

More particularly in the illustrated embodiment of the invention, the motor 3 is a special multiple voltage and multiple frequency motor which can be operated at all voltages and frequencies produced by public utilities and the like throughout the world. The particular motor 3 which has been selected for a practical world wide apparatus is a 75 horsepower motor operating at 885 revolutions per minute (RPM) and over a wide range of voltages and/or frequencies. The motor 3 may be of any suitable construction which will produce the necessary horsepower and related torque at the relatively low RPM. Typically, the motor 3 should produce a maximum throuhgout horsepower in the range of 40 to 45 horsepower at a preferred RPM range of 850 to 900 RPM. The motor 3 should produce such a drive for either 50 cycle or 60 cycle power supply and a 230/460 voltage, with the usual practical variants in the nominal specified standards. This is in contrast to the typical prior art approach which used a conventional 100 horsepower motor, with different motors provided for 60 cycle operation and for 50 cycle operation, and operation at 1,770 revolutions per minute. In the prior systems, a gear transmission is connected to reduce the speed of the extruder rotor rotation and increase the torque.

The present invention uses a lower horsepower motor operating at the reduced revolutions and producing the necessary torque to permit direct drive. The direct drive coupling 8 not only adapts the unit to universal application, but significantly increase the efficiency of operation which is, of course, of particular significance for use throughout the world.

The motor shaft 24 is direct coupled to the rotor shaft 41 by the coupling unit 8. The release clutch unit 9 directly connects the universal coupling 7 and the extruder rotor shaft, as more fully developed hereinafter. The coupling 8 includes a motor-connected universal coupling 26, a splined shaft 2, rotor-connect universal coupling 27, and the release clutch 9. The universal coupling 26 includes a flanged yoke 30 which is coupled by bolting to a hub 30a on the motor shaft. The yoke unit 30 includes a splined hub 31 that connects to splined shaft 32.

The universal coupling 27 includes a splined hub 33, slideably mating with splined shaft 32. A yoke 35 has a flange which is bolted or otherwise directly interconnected to a rotating member of the releasable clutch unit 9.

The releasable clutch unit includes a pair of clutch plates 37 and 38 which are located within the rotating housing. Clutch plate 37 is secured to and rotates with housing 36. Clutch plate 38 is rigidly secured to a rotating hub 39.

The clutch plates 37 and 38 are continuously urged into frictional engagement by a Belville spring assembly 40 mounted within the housing 36 and acting on the bearing plates 38 to establish a high load frictional engagement between the plates 37 and 38. The friction forces are such as to readily transmit the large torque required in the rice bran extruder. In practical application, the static torque strength of the shaft was equal to 22,125 inch pounds and the assembly readily transmitted torque of 443 foot pounds with the motor rotating at 885 RPM.

The clutch unit 9 may be of any suitable construction to produce an operative disconnection in response to a selected abnormal load on the motor. A slipping clutch design is preferred to produce an essentially tamper proof unit. For example, a shear pin coupling could provide protection against jamming loads. Such a coupling would require special replacement of the pin and the user could substitute a stronger shear pin thereby effectively by passing the necessary safety feature. The highly efficient direct drive coupling 8 with the releasably clutch unit provides a very significant advance in a rice bran processor particularly for application in less developed countries.

The extruder rotor shaft 41 is fixed within the hub 39 by a plurality of set screws 42 and plate 38 rotates with the extruder rotor. The drive of the motor 3 is transmitted directly through the yoke units 26 and 27, with the splined connection 25, and the engaged clutch plates 37 and 38.

The rotor 13 is thus direct driven to continuously move the powdery bran material 5 through the extruder and the extrusion gap 18. The constant speed of the rotation of the rotor 13 and the variable size of the gap 18 affects the compression sheet pressure and thereby the heat created in the powdery rice bran 5 at the extrusion cone.

In the illustrated embodiment of the invention, the rotor 13 is mounted for axial movement for varying of gap 18. Referring to FIG. 3, the bearing structure 14 includes a hub 43 threaded into a correspondingly threaded end of the extrusion shell, at 44. A double tapered roller bearing 45 is fixed within the hub and clamped to shaft 41 as by nut 46. The axial threaded movement of the hub 43 correspondingly axially moves the rotor 13. The axial movement of the rotor 13 is accomodated by the splined connection 25 in the direct drive coupling unit 8 as heretofore described. After proper positioning, the hub 43 is locked in place by a mechanical worm gear box 47.

A rotaing sprocket 48 is coupled to the hub 43 at one end by a chain 49 and to a worm gear box 47 at the other end. A hand crank connected to the worm gear box (which may have a 10-1 ratio) is used to axially move the rotor 13 for limited adjustment of the threaded connection of 43 and 44, thereby adjusting the length of the gap 18. The system may therefore be adjusted for proper heating of the powdery bran by the extruder.

The stirrer unit 2 is provided for maintaining the continuous feed of the powdery bran 5 to the feed auger 2a and thereby to the rotor 13. The stirrer unit 2 is shown as a simple paddle-type unit. The stirrer unit 2 includes a support shaft 51 rotatably journalled in mechanical feed unit 6. The shaft 51 protrudes out of the mechanical feed unit 6 and is coupled to the d.c. motor 6a and feed auger 2a using a chain 52 to establish and maintain a continuous and constant speed of the stirrer unit 2 with the feed unit 6. The die motor 6a is connected in circuit to operates simultaneously with the extruder and provides continuous stirring of the powdery bran during the entire bran process cycle. A plurality of axially and circumferentially distributed paddles or blades 53 are secured to the shaft in alignment with the top of the feed auger 2a. The blades 53 are flat radial blades secured preferably on one inch spacings to the shaft 51. The blades 53 may be canted slightly as in the mounting of propeller blades of aircraft to effectively and continuously agitate and break up the bran and thereby insure the gravity movement downwardly into the auger. In actual practice, ten blades 53 were secured to the shaft 51 circumferentially offset and spaced on one inch centers, generally as illustrated in FIGS. 1 and 2.

The extruder rotor 13 has the spiral flight 15 formed with evenly-spaced spiral 180 degree flights having a constant flight angle. The flights 15 are formed from a rod-like member spirally wound about the rotor 13 and tack welded or otherwise firmly affixed to the core. The core may be grooved to receive the rod-like flight member.

Figure 4:
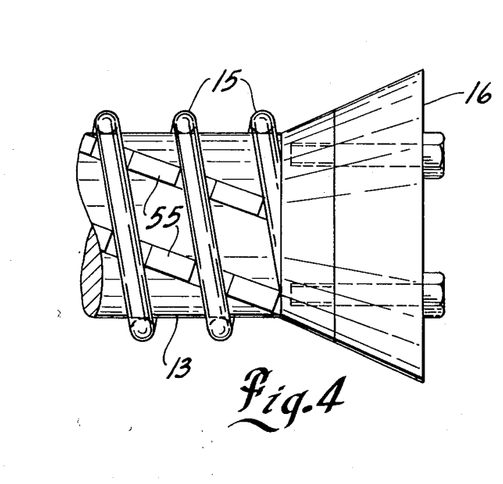
FIG. 4 is a fragmentary enlarged view of the bran extruder rotor structure shown in FIGS. 1-3.

Because of the powdery characteristics of rice bran, normal construction of the flighted rotor 13 does not provide the proper transfer and extrusion of the rice bran, particularly without moisture blowback. The heating and crushing effect is created by the extrusion process on rice bran 5 reducing the bran essentially to a slurry. Pressure builds within the extrusion gap 18 and throughout the shell 10. Further, the moisture in the bran 5 tends to create a back pressure within the shell 10 and may create blow-back of the powdery bran rearwardly within the shell 10 and back into the hopper 4, and thereby destroy the processing of rice bran 5. The conventional soybean machine which produces excellent soybean processing was found to be practically inoperative for processing rice bran. The inventor has discovered that the problem is simply solved by closely spacing of the flights and by the addition of a substantial number, and at least 12, reverse angled agitator bars 55 secured to the rotor 13 between the adjacent turns of flight 15 in the outer end of the extruder 2. The previously referenced Brady patent discloses the use of a few beater bars at the very discharge end and in one or two of the last flight grooves. The inventor has found that the bars must be substantially extended toward the inlet opening and that a minimum of 12 bars are necessary in the extruder when processing of powdery rice bran. The agitator bars 55 are small square bar members which are welded to the rotor between the flights. The agitator bars 55 are angularly oriented, and the bars in the space or grooves between adjacent flights turns are aligned with each to form reverse or oppositely directed flighting extending in an opposite direction and with the extruder forward flighting product capture chambers. The bars 55 are located at essentially 30 degrees to the horizontal and extend substantially from the extrusion opening 18 rearwardly to the feed opening and in particular extend into at least the last four flight grooves as shown in FIG. 4. In an optimum construction, the flights are spaced at substantially four inches. The agitator bars 35 are circumferentially spaced about the rotor in each turn of flight 15, with three to four bars located in circumferential spaced and parallel relation. The bars 55 are spaced only slightly less than the flighting 15 from the shell 2a and serve to force the powdery and the heated bran to move axially through the extruder cone.

The agitator bars 55 serve to appropriately increase the sealing of the heated bran slurry within the shell 10 at the gap 18 and in particular prevent the heated moisture pressure from blowing back through the slurry and the powdery bran 5 in the back portion of the extruder. The special addition of the agitator bars 55 in fact stabilize the relatively light, powdery rice bran prior to its movement into the high temperature area, and assure movement thereof into the area and through the area with sufficient force and compaction to isolate and prevent moisture blow-back.

In processing of soybeans and the like, the raw soybeans are relatively large beans providing a more or less free flow of air and steam through the beans in the feed end of the extruder. The powdery bran and the heated slurry effectively prevents such free flow of the pressurized constitutents and the inventor found that such apparatus would not maintain a flow of the powdery bran. Thus, the pressurized constitutents forced the powdery bran back into the feed system, with a resulting loss of pressure on the slurry in the extruder cone. The present invention provides a continuous flow of the powdery bran through the extruder 2.

The discharge box unit 11 is a simple box structure with an opening in the bottom which is secured directly over the discharge cone of the extruder. A mounting flange 56 abuts the cone and is bolted or otherwise fixedly secured in place. The extruded bran 5 is thus forced and injected into the discharge box 11 and immediately transferred to a low temperature cooler, not shown, for rapid cooling of the stablized bran.

As previously noted, the feed auger 2a is electrically driven with a D.C. motor 6a. The speed of the feed auger 2a is controlled such as by a rheostat, not shown, for adjusting the constant speed of the feed auger 2a. The auger 2a is driven to increase or decrease the input of bran 5 through the opening 7 into the rotor 13.

Various modes of carrying out the invention are contemplated as being within the scope of the following claims, particularly pointing out and distinctly claiming the subject matter which is regarded as the invention.

I claim:

1. A rice bran extruding apparatus for extruding powdery rice bran and thereby heating said rice bran, said heat functioning to inactivate the lipase, destroy the bacteria and stabilize the free acid in said rice bran, comprising an extruder having a tubular shell, a rotor rotatably mounted within said tubular shell, said rotor including a free end protruding outwardly of said shell, said shell and said rotor having complementing spaced surfaces defining an extrusion passageway from said shell to the exterior of said shell at said free end of said rotor, an extrusion cone secured to said shell about the free end of said rotor and defining an extrusion passageway, said rotor having a spiral flight including a plurality in excess of four turns and defining a spiral passageway extending backwardly from said extrusion passageway, a plurality of at least twelve agitator bar members secured within the final four spiral turns defined by said spiral flight, said agitator bars being angularly oriented to define a reverse flight construction, said agitator bars being substantially at a smaller angle to the horizontal axis than said flights to extrude the powdery rice bran, an electric motor mounted in alignment with said rotor, a direct drive connection unit connecting said motor to said rotor and establishing a direct one-to-one drive between said motor and said rotor, said rotor being operable to move said rice bran in a continous manner through said shell and said extrusion cone, and a releasable connection unit in said direct drive connection unit and operably disengaging said rotor from said motor in response to a predetermined differential pressure across said connection unit.

2. The bran extruding apparatus of claim 1 wherein said direct drive connection unit includes a splined shaft and a mating splined hub slideably mounted on said splined shaft, said releasable connection unit including a clutch unit having an outer rotatable housing, a clutch plate member mounted to said housing, a second clutch plate member in opposed relation to said first named clutch plate member and having a mounting hub, and resilient spring means biasing said clutch plate members in frictional engagement.

3. The rice bran apparatus of claim 1 wherein said extrusion passageway emits said rice bran in an annular stream, a discharge box unit mounted in overlying relationship to said extrusion cone and directing said extruded stabilized rice bran downwardly therefrom, a rapid cooling means coupled to said discharge unit for receiving of said rice bran and providing essentially instantaneous cooling thereof.

4. A rice bran extruding apparatus comprising a high pressure extruder adapted to receive powdery rice bran in one end and to progressively transfer said bran under increasing compression and extruding the bran through a restricted extrusion cone defining an extrusion opening, said powdery rice bran being rapidly raised in temperature to a temperature of at least approximately 130° C. to completely neutralize the lipase and reduce bacterial count to a count of the order of less than 10, a multivoltage and multi-frequency motor operable over a wide range of frequencies and a wide range of voltages, a direct drive coupling between said motor and said extruder, said extruder having a flighted member rotatably mounted and having an outwardly projected rigid shaft projecting from said extruder, said motor having an integral rigid driven motor shaft, said direct drive coupling including a slip clutch mechanism having a torque transmitting characteristic in excess of all normal torque created by extrusion of bran from said extrusion cone, whereby said direct drive operates to continuously extrude bran, said slip clutch means being responsive to abnormal loads on said flighted rotor to operatively disengage the rotor from said motor and permit operation of the motor without rotation of said flighted member.

5. The apparatus of claim 4 wherein said motor produces 75 horsepower rotating at 885 revolutions per minute.

6. The apparatus of claim 4 wherein said flighted member includes a center core having a core shaft extending from one end, said direct drive coupling includes a splined shaft and a hub coupling mounted on said splined shaft, said splined shaft and said splined hub each being connected to said motor shaft and to said core shaft whereby said core shaft may be axially positioned relative to said motor shaft, and means coupled to said rotor shaft for axially moving of said rotor and setting the size of said extrusion opening and thereby the temperature of said rice bran, said heat functioning to inactivate the lipase in said rice bran.

7. A rice bran extruding processor for extruding powdery rice bran and thereby heating said rice bran, said heat functioning to inactivate the lipase, destroy the bacteria and stablize the free fatty acid in said rice bran, comprising an extruder having a flighted rotor rotatably mounted within a tubular shell and terminating in an extrusion nozzle, said rotor having a spiral flight including a plurality of flight turns in excess of four and defining a spiral passageway extending backwardly from said extrusion nozzle, a plurality of at least twelve agitator bar elements secured within the final four spiral turns defined by said spiral flight, said agitator bars being angularly oriented to define a reverse flight construction between said spiral turns, said agitator bars being substantially at a smaller angle to the horizontal axis than said spiral flight to extrude the powdery rice bran.

8. The apparatus of claim 7 wherein said agitator bar elements are spaced from said shell only slightly less than said spiral light.

9. The apparatus of claim 7 wherein said spiral flight is formed from a round rod-like element, said extruder having a rotatable core having a spiral groove, said rod-like element being located in said groove within the rotor core and being intimately secured to said core, said agitator bar elements being round rod-like elements secured to the surface of said rotor core and having an outermost edge surface located slightly within the outermost edge surface of the flighting round rod-like element.

10. The apparatus of claim 7 having a bran supply hopper for gravity feed of powdery bran, a feed auger unit mounted between the hopper and extruding for supplying of bran to the extruder, a bran stirrer located within said hopper, said stirrer includes a horizontal support shaft and a plurality of stirring blades secured to said shaft, said blades being canted from a perpendicular plane through said shaft and means to continuously rotate the bran stirrer during operation of the feed auger.

11. The rice bran apparatus of claim 7 wherein said extrusion nozzle emits said rice bran in an annular stream, a discharge box unit mounted in overlying relationship to said nozzle and directing said extruded stablized rice bran outwardly therefrom, a rapid cooling means coupled to said discharge unit for receiving of said rice bran and providing essentially instantaneous cooling thereof.

12. A rice bran extruding processor for extruding powdery rice bran and thereby heating said rice bran, said heating of said bran functioning to inactivate the lipase, destroy the bacteria and stablize the free fatty acid in said rice bran, comprising an extruder having a flighted rotor rotatably mounted within a tubular shell and terminating in an extrusion nozzle, said rotor having a spiral flight which with said shell defines a spiral passageway extending backwardly from said extrusion nozzle, an electric motor mounted in alignment with said rotor, a direct drive connection unit connecting said motor and said rotor and establishing a direct one-to-one drive between said motor and said rotor, said rotor being operable to move said rice bran in a continuous manner through said shell and said extrusion nozzle, and a releasable connection unit in said direct drive connection unit and operably disengaging said flighted rotor from said motor in response to a predetermined differential pressure across said connection unit.

13. The bran extruding apparatus of claim 12 wherein said direct drive unit includes a splined shaft and a mating splined hub slideably mounted on said splined shaft, said releasable connection unit including a clutch unit having an outer rotatable housing, a clutch plate member mounted to said housing, a second clutch plate member in opposed relation to said first named clutch plate member and having a mounting hub, and resilient spring means biasing said clutch plate members into frictional engagement.

14. The apparatus of claim 12 wherein said spiral flight includes a number of turns substantially in excess of four turns, and a plurality of at least 12 agitator bar elements are circumferentially distributed within at least the last four turns defined by said spiral flight and are spaced from said shell only slightly less than said spiral flight.

15. The apparatus of claim 14 wherein said rotor includes a core having a spiral groove, said spiral flight is formed from said round rod-like element, said rod-like element being located in said groove within the rotor core and being intimately secured to said core, said agitator bar elements being round rod-like elements secured to the surface of said rotor core and having an outermost edge surface located slightly within the outermost edge surface of the spiral flight rod-like element.

16. The apparatus of claim 14 having a bran supply hopper for gravity feed of powdery bran, a feed auger unit mounted between the hopper and supplying bran to the extruder, a bran stirrer located within said hopper, said stirrer includes a horizontal support shaft and a plurality of stirring blades secured to said shaft, said blades being canted from a perpendicular plane through said shaft and means to continuously rotate the bran stirrer during operation of the feed auger.

17. A rice bran extruding apparatus comprising a high pressure extruder adapted to receive rice bran in one end and to progressively transfer said rice bran under increasing compression and extruding the rice bran through a restricted opening in an extrusion cone, said rice bran being rapidly raised in temperature to a temperature of at least approximately 130° C. to completely neutralize the lipase and reduce bacteria count to a count of the order of less than 10, a multi-voltage and multi-frequency A.C. motor connected to operate said extruder and operable over a wide range of frequencies and a wide range of voltages, said A.C. motor having a horsepower rating of less than 100 horsepower and a through-put of 40 to 45 horsepower and rotating in the range of 850 to 900 RPM.

18. The apparatus of claim 17 wherein said extruder having a flighted rotor rotatably mounted and having an outwardly projected rigid rotor shaft projecting from said flighted rotor, said motor having an integral rigid driven motor shaft, a direct drive coupling connecting said shafts and including a slip clutch means having a torque transmitting characteristic in excess of all normal torque created by extrusion of bran from said extrusion cone, whereby said direct drive coupling operates to continuously extrude bran, said slip clutch means being responsive to abnormal loads on said flighted rotor to operatively disengage the rotor from said motor and permit operation of the motor without rotation of said flighted rotor.

19. The apparatus of claim 17 wherein said motor produces 75 horsepower at 885 RPM.

20. The apparatus of claim 18 wherein said direct drive coupling includes a splined shaft and a hub coupling mounted in line with said motor shaft and said flighted rotor shaft, said splined shaft and said splined hub each being connected to said motor shaft and to said flighted rotor shaft whereby said flighted rotor shaft may be axially positioned relative to said motor shaft, and means coupled to said flighted rotor shaft for axially moving of said rotor and setting the size of the extrusion opening of said extrusion cone and thereby the temperature of said rice bran, said heat functioning to neutralize the lipase and reduce the bacterial count in said rice bran.

21. The bran extruding apparatus of claim 20 wherein said slip clutch mechanism includes an outer rotatably housing, a clutch plate member mounted to said housing, a second clutch plate member in opposed relation to said first named clutch plate member and having a mounting hub, and resilient spring means biasing said clutch plate members into frictional engagement.

22. The rice bran apparatus of claim 21 having a discharge box unit mounted in overlying relationship to said cone and directing said extruded stabilized rice bran downwardly therefrom, and a rapid cooling means coupled to said discharge unit for receiving of said rice bran and providing essentially instantaneous cooling thereof.

* * * * *

UNITED STATES PATENT AND TRADEMARK OFFICE
CERTIFICATE OF CORRECTION

PATENT NO. : 4,741,264

DATED : May 3, 1988

INVENTOR(S) : DANIEL L. McPEAK

It is certified that error appears in the above-identified patent and that said Letters Patent is hereby corrected as shown below:

Title page:
In the Abstract: Page 25, line 5, delete "information" and substitute therefor ---formation---; In the Specification: Col. 1, line 39, delete "stbilization" and substitute therefor ---stabilization---, Col. 3, line 25, after "available" and before "." insert ---material---, Col. 4, line 50, delete "tht" and substitute therefor ---that---, Col. 4, line 52, delete "stablizing" and substitute therefor ---stabilizing---, Col. 5, line 40, delete "throuhgout" and substitute therefor ---throughout---, Col. 5, line 66, delete "increase" and substitute therefor ---increases---, Col. 6, line 3, delete "7" and substitute therefor ---27---, Col. 6, line 6, delete "2" and substitute therefor ---42---, Col. 7, line 4, delete "rotaing" and substitute therefor ---rotating---, Col. 7, line 22, delete "operates" and substitute therefor ---operate---, Col. 8, line 52, delete "stablized" and substitute therefor ---stabilized---; In the Claims: Col. 8, line 67, insert ---fatty--- after "free", Col. 10 line 18, delete "processor" and substitute therefor ---apparatus---, Col. 10, line 36, delete "light" and substitute therefor ---flight---, Col. 10, line 61, delete "outwardly" and substitute therefor ---downwardly---, Col. 10, line 68, delete

UNITED STATES PATENT AND TRADEMARK OFFICE
CERTIFICATE OF CORRECTION

PATENT NO. : 4,741,264

DATED : May 3, 1988

INVENTOR(S) : DANIEL L. McPEAK

It is certified that error appears in the above-identified patent and that said Letters Patent is hereby corrected as shown below:

"stablize" and substitute therefor ---stabilize---, Col. 10, line 65, delete "processor" and substitute therefor ---apparatus---, Col. 11, line 35, delete the first occurrence of "said" and substitute therefor ---a---, Col. 12, line 41, delete "rotatably" and substitute therefor ---rotatable---

Signed and Sealed this

Third Day of April, 1990

Attest:

HARRY F. MANBECK, JR.

Attesting Officer

Commissioner of Patents and Trademarks